US011193241B2

(12) United States Patent
Hakansson

(10) Patent No.: US 11,193,241 B2
(45) Date of Patent: Dec. 7, 2021

(54) METHOD OF PRODUCING A FILLER

(71) Applicants: Stora Enso Oyj, Helsinki (FI); Omya International AG, Oftringen (CH)

(72) Inventor: Philip Hakansson, Solvesborg (SE)

(73) Assignees: Stora Enso Oyj, Helsinki (FI); Omya International AG, Oftringen (CH)

(*) Notice: Subject to any disclaimer, the term of this patent is extended or adjusted under 35 U.S.C. 154(b) by 172 days.

(21) Appl. No.: 15/527,161

(22) PCT Filed: Nov. 19, 2015

(86) PCT No.: PCT/IB2015/058955
§ 371 (c)(1),
(2) Date: May 16, 2017

(87) PCT Pub. No.: WO2016/079700
PCT Pub. Date: May 26, 2016

(65) Prior Publication Data
US 2017/0335519 A1 Nov. 23, 2017

(30) Foreign Application Priority Data
Nov. 19, 2014 (SE) .................... 1451395-6

(51) Int. Cl.
*D21H 19/38* (2006.01)
*D21H 19/52* (2006.01)
(Continued)

(52) U.S. Cl.
CPC ......... *D21H 19/385* (2013.01); *C01F 11/182* (2013.01); *C09C 1/021* (2013.01);
(Continued)

(58) Field of Classification Search
CPC . C01F 11/182; C01P 2004/03; C01P 2004/61; C01P 2004/62; C01P 2006/12;
(Continued)

(56) References Cited

U.S. PATENT DOCUMENTS

| 2,186,494 | A | 1/1940 | Bode |
| 3,443,890 | A | 5/1969 | Sisson et al. |
| 6,294,143 | B1 | 9/2001 | Deutsch et al. |
| 2004/0247513 | A1 | 12/2004 | Huhn, III |

(Continued)

FOREIGN PATENT DOCUMENTS

| EP | 2287398 A1 * | 2/2011 | ............ D21H 11/18 |
| JP | 2001-139328 A | 5/2001 | |

(Continued)

OTHER PUBLICATIONS

EP-2287398-A1 machine translation ; Feb. 2011.*

(Continued)

*Primary Examiner* — Shuangyi Abu Ali
(74) *Attorney, Agent, or Firm* — Olive Law Group, PLLC

(57) ABSTRACT

The invention discloses a method of producing a filler composition to be used in paper or board production, said method comprising providing a suspension comprising calcium hydroxide and performing carbonation of the calcium hydroxide to form precipitated calcium carbonate (PCC). The invention is characterized in that starch and/or carboxy methyl cellulose (CMC) is added to the suspension during said carbonation of calcium hydroxide. The method of the invention enables an increased filler content in paper or paperboard without substantially increasing the dusting tendency or decreasing the strength of the paper or board.

5 Claims, 4 Drawing Sheets

(51) Int. Cl.
| | |
|---|---|
| C09C 1/02 | (2006.01) |
| D21H 19/54 | (2006.01) |
| C09C 3/10 | (2006.01) |
| D21H 17/26 | (2006.01) |
| D21H 17/28 | (2006.01) |
| D21H 17/67 | (2006.01) |
| D21H 17/69 | (2006.01) |
| D21H 17/00 | (2006.01) |
| C01F 11/18 | (2006.01) |

(52) U.S. Cl.
CPC ............... *C09C 3/10* (2013.01); *D21H 17/26* (2013.01); *D21H 17/28* (2013.01); *D21H 17/675* (2013.01); *D21H 17/69* (2013.01); *D21H 17/74* (2013.01); *D21H 19/52* (2013.01); *D21H 19/54* (2013.01); *C01P 2004/03* (2013.01); *C01P 2004/61* (2013.01); *C01P 2004/62* (2013.01); *C01P 2006/12* (2013.01); *C01P 2006/22* (2013.01); *C01P 2006/60* (2013.01)

(58) Field of Classification Search
CPC .. C01P 2006/22; C01P 2006/60; C09C 1/021; C09C 3/10; D21H 17/26; D21H 17/28; D21H 17/675; D21H 17/69; D21H 17/74; D21H 19/385; D21H 19/52; D21H 19/54
See application file for complete search history.

(56) References Cited

U.S. PATENT DOCUMENTS

2010/0135891 A1\* 6/2010 Hansen .................. B01J 4/001
423/432
2013/0312925 A1\* 11/2013 Saastamoinen ........ D21H 17/28
162/175

FOREIGN PATENT DOCUMENTS

| JP | 2002-540056 A | 11/2002 |
|---|---|---|
| JP | 2006-527151 A | 11/2006 |
| WO | 02/086238 A1 | 10/2002 |
| WO | 2007/067146 A1 | 6/2007 |
| WO | 2009/000345 A1 | 12/2008 |
| WO | 2014/147155 A1 | 10/2014 |
| WO | 2014/174155 A1 | 10/2014 |

OTHER PUBLICATIONS

International Search Report and Written Opinion for PCT/IB2015/058955 dated Mar. 9, 2016.
Zhao, Yulin, et al. "Improvement of paper properties using starch-modified precipitated calcium carbonate filler." TAPPI Journal, 2005, vol. 4, No. 2. pp. 3-7.
Extended European Search Report for related EP application 15861379.4 dated Mar. 22, 2018 (six (6) pages).
Office Action for Japanese Patent JP 2017-527210 dated Oct. 23, 2019 (three (3) pages).

\* cited by examiner

| Measurement | Unit | 1 | 2 | 3 | 4 | 5 | 6 | 7 | 8 | 9 | 10 | 11 |
|---|---|---|---|---|---|---|---|---|---|---|---|---|
| Grammage | g/m² | 79.6 | 79.8 | 80.2 | 79.7 | 80.1 | 79.4 | 79.8 | 79.8 | 79.7 | 79.4 | 80.0 |
| Thickness | μm | 132 | 133 | 132 | 132 | 133 | 131 | 135 | 134 | 131 | 133 | 133 |
| Thickness Stddev. | μm | 1.75 | 1.58 | 1.66 | 1.29 | 1.03 | 0.96 | 2.50 | 2.79 | 3.11 | 2.18 | 2.32 |
| R457 - UV | % | 89.7 | 89.9 | 88.9 | 89.5 | 89.5 | 89.7 | 89.5 | 89.9 | 89.8 | 90.2 | 89.8 |
| CIE Whiteness |  | 80.8 | 81.2 | 79.1 | 80.4 | 80.3 | 80.8 | 80.9 | 81.6 | 81.3 | 82.0 | 81.7 |
| Opacity | % | 91.4 | 91.9 | 90.5 | 91.3 | 91.4 | 91.6 | 91.6 | 92.0 | 91.5 | 92.1 | 92.8 |
| Scattering | m²/kg | 79.67 | 83.31 | 71.39 | 78.30 | 78.25 | 80.66 | 78.72 | 82.68 | 79.34 | 85.21 | 87.37 |
| Tensile strength | N | 25.5 | 22.3 | 28.5 | 23.6 | 27.7 | 25.2 | 23.2 | 22.1 | 24.2 | 21.2 | 22.8 |
| Tensile strength Stddev. | N | 1.3 | 0.7 | 1.0 | 0.6 | 0.9 | 1.0 | 1.0 | 0.4 | 1.5 | 1.0 | 1.3 |
| Tensile Energy | mJ | 34.4 | 27.5 | 38.4 | 31.5 | 37.6 | 32.6 | 27.8 | 28.0 | 28.9 | 25.4 | 31.0 |
| Tensile Energy Absorption | J/m² | 51.5 | 41.3 | 57.6 | 47.3 | 56.4 | 48.9 | 41.7 | 42.0 | 43.4 | 38.0 | 46.6 |
| TEA Index-md | J/g | 647.1 | 517.6 | 717.5 | 593.1 | 703.9 | 616.6 | 522.7 | 527.0 | 544.6 | 479.0 | 582.0 |
| Tensile Index | Nm/g | 21.4 | 18.6 | 23.7 | 19.7 | 23.0 | 21.2 | 19.4 | 18.5 | 20.3 | 17.8 | 19.0 |
| Filler content | % | 25.8 | 29.0 | 24.0 | 31.3 | 25.9 | 29.1 | 25.00 | 28.60 | 24.50 | 30.30 | 30.10 |

Fig. 6

METHOD OF PRODUCING A FILLER

CROSS REFERENCE TO RELATED APPLICATIONS

This application is a 35 USC 371 application of International PCT Patent Application No. PCT/IB2015/058955, filed on Nov. 19, 2015, which claims priority to Sweden Patent Application No. 1451395-6, filed on Nov. 19, 2014; the contents of which are hereby incorporated by reference herein in their entireties.

FIELD OF THE INVENTION

The present invention relates to a method for producing a filler to be used in paper or paperboard production. Other embodiments are related a filler, to a paper or paperboard and to a method of producing a paper or paperboard.

BACKGROUND

In paper making production, fillers are added to the furnish in order to improve optical and surface properties of the paper. Increasing the filler content of paper can provide the papermaker with numerous benefits, including savings in the cost of raw materials and improved optical properties.

Typically, clay or different forms of calcium carbonate are used as fillers. Calcium carbonate can for example be in the form of chalk, marble or precipitated calcium carbonate (PCC). In recent years, precipitated calcium carbonate (PCC) has become common. Today, PCC is the most prevailing filler used in the production of fine paper.

Precipitated calcium carbonate (PCC) can be produced by calcining limestone (calcium carbonate rock) at high temperature to decompose the calcium carbonate to carbon dioxide (CO2) and calcium oxide (lime), slaking the resulting lime (calcium oxide) by addition of water to form a lime suspension (calcium hydroxide), and then performing carbonation of the resulting lime suspension. The carbonation may be done by treatment with CO2 gas whereby calcium carbonate is precipitated.

There are, however, limits to the amount of filler that can be substituted for papermaking fiber at the paper or paperboard production. At high filler contents, the paper or the paperboard can suffer losses in stiffness and in strength. Furthermore, the dusting tendency of paper or paperboard increases at higher filler contents. High filler content in, e.g. newsprint paper, involves problems at the printing presses due to the increased dusting tendency and the losses in strength.

Efforts to reduce the dusting tendency of fine paper include the treatment of both sides of the paper with starch in the paper machine. This treatment, the so called surface sizing of the paper, is expensive and reduces the productivity.

WO2007067146 discloses a process of producing PCC, wherein the carbonation is performed in the presence of starch and/or CMC. The purpose of the process described in said publication is to improve the affinity of the PCC particles to the fibers and to thereby decrease the dusting tendency and increase the strength of the paper or paperboard. In accordance with the method described in WO2007067146, starch is firstly added to a calcium hydroxide solution, whereupon carbon dioxide is added to said solution, i.e. the starch is added to the calcium hydroxide prior to the step of carbonation. However, when the carbon dioxide is added prior to the carbon dioxide, most of the starch is incorporated in the core of the formed PCC particles while the PCC forms a coating, whereby the desired effect is limited. Moreover, the addition of starch increases the viscosity of the suspension, which affects the distribution of the carbon dioxide negatively. Thus, this method has neither shown satisfying result nor productivity.

WO2003087472 describes a filler treatment comprising the preparation of a swollen starch-latex composition, which composition may be mixed with filler particles, such as PCC and added to pulp slurry. This treatment is said to decrease the negative effect of the filler addition on strength properties of the produced paper. However, this concept has shown to have certain limitations as well, especially when it comes to retention of the filler particles in the paper.

Thus, there remains a need for a more effective method to produce a filler material which enables the use of increased filler content in the paper or board.

WO 2011/121065 A1 discloses a process for preparing PCC comprising inter alia the step of preparing an aqueous suspension of PCC seeds by carbonating a suspension of calcium hydroxide in the presence of strontium hydroxide. A process for producing PCC, wherein the addition rate of the calcium carbonate slurry to the reaction vessel is such that a certain electrical conductivity is maintained in the reaction vessel, is described in EP 2 537 900 A1.

US 2011/035560 A1 describes a method to manufacture PCC involving the use of a comb polymer, which reduces the carbonation time of the PCC. A grinding agent for grinding coarse lime is disclosed in EP 0 313 483 A1. EP 2 447 213 A1 relates to the production of high purity PCC involving the step of slaking lime with an aqueous ammonium chloride solution.

WO 2013/142473 A1 relates to a process comprising the steps of preparing slaking quick lime to obtain slaked lime, and subjecting the slaked lime, without agitation, without prior cooling in a heat exchanger, and in the absence of any additives, to carbonation with carbon dioxide gas to produce PCC. PCC production processes including additives are disclosed in U.S. Pat. Nos. 6,294,143, 5,232,678, and 5,558,850. A method for producing slaked lime by slaking lime with a polymer having anionic groups is described in JP 2008/074629 A. EP 0 844 213 A1 discloses a method of producing a precipitate of an alkaline earth metal compound involving the use of a dispersing agent.

WO 2010/018432 A1 discloses a process to prepare precipitated calcium carbonate implementing low charge acrylate and/or maleinate-containing polymers. A process for producing platy precipitated calcium carbonate involving the step of adding a polyacrylate to a suspension of calcium hydroxide prior to the completion of carbonation is described in WO 2005/000742 A1. WO 2004/106236 A1 relates to a process for producing platy precipitated calcium carbonate involving the step of adding a dry condensed phosphate additive to a suspension of calcium hydroxide prior to the completion of carbonation.

EP 2 939 980 A1 describes a process for producing an aqueous suspension of precipitated calcium carbonate, which involves the use of water-soluble polymers in combination with a slaking additive. Furthermore, reference is made to the applicant's unpublished European patent applications no. 14 190 261.9 and 15 157 025.6, which are also concerned with the preparation of PCC.

WO 2014/055787 A1 discloses a filler suspension for use in papermaking, comprising filler particles, ionic starch and a complementary ionic co-additive. WO 2014/055092 A1 describes a filler suspension for use in papermaking, comprising filler particles, swollen cationic starch, and anionic, water-soluble polymer.

DESCRIPTION OF THE INVENTION

One object of the present invention is to provide an effective method to produce filler, which enables an increased filler content in paper or paperboard without substantially increasing the dusting tendency or decreasing the strength of the paper or board.

The invention discloses a method of producing a filler composition to be used in paper or board production, said method comprising providing a suspension comprising calcium hydroxide and performing carbonation of the calcium hydroxide to form precipitated calcium carbonate (PCC). The invention is characterized in that starch and/or carboxy methyl cellulose (CMC) is added to said suspension during said carbonation of calcium hydroxide.

In the context of the invention, the term "during" means that starch and/or CMC is added to the suspension after carbonation of some of the calcium hydroxide, but before carbonation of all of the calcium hydroxide present in the suspension. "Carbonation" (also sometimes referred to as "Carbonatation") refers to the chemical reaction in which calcium hydroxide reacts with carbon dioxide and forms insoluble calcium carbonate. The carbonation of said calcium hydroxide is preferably performed by the addition of carbon dioxide to the suspension, e.g. by bubbling a gas stream comprising carbon dioxide into the suspension for a certain time, whereby the calcium hydroxide is reacted with the carbon dioxide and calcium carbonate is precipitated. The starch and/or CMC may be added to the suspension after the addition of carbon dioxide has started, but before the addition of the carbon dioxide is completed, i.e. during the addition of carbon dioxide. The step of carbonating, and how much of the carbon hydroxide that has been reacted, may be measured by measuring the conductivity or the pH of the suspension during the addition of carbon dioxide. Preferably, starch and/or CMC is added to the suspension when between 50% and 95%, or more preferably when between 75-95%, or even more preferably 85-95% of the total amount calcium hydroxide present in the suspension has been reacted with carbon dioxide and formed calcium carbonate. The suspension of calcium hydroxide is carbonated over a reaction time period $\Delta t_C$ to form an aqueous suspension of precipitated calcium carbonate. The starch is preferably added during the reaction time period $\Delta t_C$ after 25 percent of the reaction time period $\Delta t_C$ is elapsed. Preferably, the starch is added during the reaction time period after at least 50%

Throughout the present document, the "particle size" of precipitated calcium carbonate, or other particulate materials is described by its distribution of particle sizes. Therein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all particles are smaller than this particle size. For the purpose of the present invention, the particle size is specified as weight median particle size $d_{50}$ unless indicated otherwise. Particle sizes were determined by using a Malvern Mastersizer 3000. The method and the instrument are known to the skilled person and are commonly used to determine the particle size of fillers and pigments.

"Precipitated calcium carbonate" (PCC) in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium and carbonate salts, calcium chloride and sodium carbonate for example, in an aqueous environment. PCC may be vaterite, calcite or aragonite. PCCs are described, for example, in EP 2 447 213 A1, EP 2 524 898 A1, EP 2 371 766 A1, or WO 2013/142473 A1.

The term "starch" in the meaning of the present invention refers to polymeric carbohydrate structures, formed by a plurality of glucose units joined together by glycosidic bonds. These structures may be linear, but may also contain various degrees of branching.

The term "anionic" in the meaning of the present invention refers to a compound having a net negative charge. Said compound is typically modified with anionic groups. The term "anionic" does not exclude the presence of cationic groups provided that the sum of individual charges is negative.

The term "amphoteric" or "neutral" in the meaning of the present invention refers to a compound modified with anionic groups as well as cationic groups such that the number of negative charges in the anionic groups is about equal to the number of positive charges in the cationic groups.

The term "cationic" in the meaning of the present invention refers to a compound having a positive net charge. Said compound is typically modified with cationic groups. The term "cationic" does not exclude the presence of anionic groups provided that the sum of individual charges is positive.

For the purpose of the present invention, the "solids content" of a liquid composition is a measure of the amount of material remaining after all the solvent or water has been evaporated.

A "specific BET surface area" (SSA) in the meaning of the present invention is defined as the surface area of the precipitated calcium carbonate particles divided by the mass of PCC particles. As used therein the specific surface area is measured by adsorption using the BET isotherm (ISO 9277: 1995) and is specified in $m^2/g$.

For the purpose of the present invention, the term "viscosity" or "Brookfield viscosity" refers to Brookfield viscosity. The Brookfield viscosity is for this purpose measured by a Brookfield (Type RVT) viscometer at 25° C.±1° C. at 100 rpm using an appropriate spindle of the Brookfield RV-spindle set and is specified in mPa·s. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1600 mPa·s the spindle number 4 may be used, and for a viscosity range between 800 and 3200 mPa·s the spindle number 5 may be used.

For the purpose of the present application, "water-insoluble" materials are defined as materials which, when 100 g of said material is mixed with 100 g deionised water and filtered on a filter having a 0.2 μm pore size at 20° C. to recover the liquid filtrate, provide less than or equal to 0.1 g of recovered solid material following evaporation at 95 to 100° C. of 100 g of said liquid filtrate. "Water-soluble" materials are defined as materials which, when 100 g of said material is mixed with 100 g deionised water and filtered on a filter having a 0.2 μm pore size at 20° C. to recover the liquid filtrate, provide more than 0.1 g of recovered solid material following evaporation at 95 to 100° C. of 100 g of said liquid filtrate.

A "suspension" or "slurry" in the meaning of the present invention comprises insoluble solids and water, and optionally further additives, and usually contains large amounts of solids and, thus, is more viscous and can be of higher density than the liquid from which it is formed.

When starch and/or CMC is added to the suspension during the carbonation in accordance with the invention, the interaction between starch and the PCC particles or the interaction between CMC and the PCC particles becomes effective and the retention of the formed filler material in the paper or paperboard is substantially improved. The problem of the starch or CMC being incorporated in a shell of PCC connected with the prior art is avoided while the benefit of the interaction between the starch and the PCC or the interaction between CMC and the PCC is optimized. The starch and/or CMC can be added in the form of a powder or in the liquid form, such as an aqueous solution or an aqueous suspension of starch and/or CMC. Preferably, the starch and/or CMC is added in the form of a powder. Use of the filler of the invention in paper or paperboard decreases the dusting tendency of PCC and minimizes the negative effect of filler addition on the strength of the paper or paperboard. Moreover, when starch is added during carbonation (compared to prior the carbonation) the negative effect on the viscosity is limited whereby the reaction time decreases and the productivity is enhanced.

Preferably, the starch is uncooked, i.e. the starch molecules are in the form of granules which may have a median particle size $d_{50}$ between 1 μm to 100 μm. When starch granules are added to the suspension during the carbonation step, the PCC particles formed are attached on and partly in the starch granules in a distribution giving rise to optimal physical and chemical properties of the thus formed filler particles. This improves the retention of the PCC particles.

Most preferably the starch is swollen. Starch granules swell when treated at an increased temperature, which temperature should be approximately at or just below the gelatinization temperature (gelatinization temperature meaning the temperature when the granules burst and amylose and/or amylopectin leach out and dissolve, also referred to as gel point). The swollen starch may be prepared by dispersing dry starch in a solvent, preferably water, and heating the suspension to a temperature that is approximately the gel point of the particular starch. The swollen starch may comprise or consist of starch granules of which 80% are within the range of 30 μm to 70 μm. The larger sizes of the starch granules improve the retention properties of the filler even further.

The reaction temperature during carbonation is preferably between 30 and 100° C., more preferably 50-100° C., and even more preferably between 60-90° C. When uncooked starch is added to a reactor at such a temperature, during carbonation of the calcium hydroxide, the starch granules start swelling. In this way, the PCC particles are incorporated in and on the swollen starch granules in an optimal way with regard to retention properties of the thus formed filler material. The addition of starch during the carbonation, preferably at the end of the carbonation, reduces the risk that some of the swollen starch granules burst and dissolve.

The starch is selected from unmodified starch, anionic, cationic, or amphoteric starch, and mixtures thereof. The starch can be unmodified, oxidized, crosslinked, in the form of an ester or an ether or modified in any other way. The starch can be based on any raw material, e.g. potato, maize, wheat, tapioca, rize, corn, waxy maize or waxy corn and/or mixtures thereof. The starch may be added to the suspension in dry form, preferably in the form of a dry powder, or in liquid form, such as an aqueous solution or an aqueous suspension or slurry. Native starch may be preferred due to economic benefits. The degree of substation of the starch depends on the wet-end chemistry, and especially on the retention agent system, of the paper machine that is used to produce the paper containing the PCC. The starch may be added in an amount from 0.1 to 20 wt-% based on the total weight of the calcium oxide containing material (i.e. the suspension comprising calcium hydroxide). Most preferably, the ratio between starch and the precipitated calcium carbonate (PCC) formed should be within the interval of 1/100 and 25/100.

The carboxy methyl cellulose can be nonionic, anionic or cationic carboxy methyl cellulose or a mixture of two or more of said carboxy methyl celluloses. The Carboxy methyl cellulose can be of any substitution grade or have any length of molecular chain. Most preferably, the ratio between said carboxy methyl cellulose and the precipitated calcium carbonate formed is within 1/100 to 15/100.

The invention further relates to a filler produced by the method described above.

Furthermore, the invention relates to a paper or paperboard comprising said inventive filler and to a method of producing paper or paperboard comprising providing a furnish comprising cellulose fibers, adding the filler of the invention to said furnish and subsequently forming and dewatering the furnish to form a paper or paperboard.

The filler can be added to the furnish as a slurry at any stage of the paper making process prior to the head box including, but not limited to, at the suction side of the machine chest pump, at the suction side of the fan pump or at the suction side of the mixing pump. The filler of the invention may be mixed with additives or other fillers before added to the furnish. The filler produced by the method of the invention can for example be mixed with clay, talc, calcium sulfate hemihydrate, and/or calcium sulfate dehydrate prior to its add to the furnish. The furnish employed in the present invention can comprise any kind of pulp, including but not limited to chemical pulps, including sulfate and sulfite pulps from both hard and soft woods, thermo-mechanical pulps, mechanical pulps and ground wood pulps. Furthermore, the furnish can include one or more conventional paper additives such as hydrophobic agents, dry strength agents, wet strength agents etc.

The invention further relates to a method of producing paper or paperboard comprising the steps of; providing a fiber-containing furnish, forming and dewatering the fiber containing furnish to form a web and adding the filler of the invention to the surface of said web.

The filler can thus also be added to the surface of a fiber-based web, e.g. in the surface sizing of the web by use of a size press. Prior art solutions of adding calcium carbonate to the surface of a paper web, and thereby maximizing filler loading and improving papermaking economics, oftentimes propose the use of ground calcium carbonate (GCC). However, previous attempts to use PCC (which is cheaper than GCC) in the surface size have involved drawbacks especially with regard to binding of the filler to the fibers. The filler produced in accordance with the invention facilitates the use of PCC as a filler or pigment in the surface sizing of paper or paperboard. In this context, the term "filler" refers both to filler material and/or pigment material.

The filler of the invention can be used in the production of any kind of paper or paperboard. The invention is of particular value in the production of fine paper, supercalendered paper or newsprint paper. The use of the filler of the invention in, e.g. newsprint or supercalendered paper, improves the quality of the paper significantly. The increase of filler in the paper, which the present invention makes possible, increases the ash content whereby the printing quality and the opacity of the paper is improved. Moreover, use of the filler produced according to the invention makes it possible for the paper- or board producer to avoid conventional surface sizing of the paper and thereby significantly reduce energy consumption and improve paper machine productivity. By the method of the invention, the amount of filler in the paper can be increased by at least 5% without affecting the strength properties of the produced paper significantly. The content of filler produced according to the present invention in uncoated fine paper can be e.g. 25-35% by weight based on dry paper. In newsprint paper, the content of filler produced according to the present invention can be e.g. 10-15%. In supercalendered paper, the content of filler may be at least 39%, preferably between 39-45% by weight based on dry paper.

DETAILED DESCRIPTION OF EMBODIMENTS

Starch

According to one embodiment, the at least one starch is a homopolysaccharide. Preferably, the homopolysaccharide may be composed of a plurality of repeating units (at least 10) of glucose. More preferably, the homopolysaccharide may be a linear chain of 1,4-linked α-D-glucopyranosyl units. Additionally or alternatively, the homopolysaccharide can comprise α-D-glucopyranosyl units which are 1,6-linked to the linear chain of 1,4-linked α-D-glucopyranosyl units. In one preferred embodiment, the 1,6-linked α-D-glucopyranosyl units are also linked to a linear chain of 1,4-linked α-D-glucopyranosyl units.

The at least one starch can be selected from unmodified starch, cationic starch, amphoteric starch, anionic starch, and mixtures thereof. According to a preferred embodiment the at least one starch is cationic starch.

According to one embodiment the at least one starch is an unmodified starch. The unmodified starch can be selected from the group consisting of wheat starch, corn starch, rice starch, potato starch, tapioca starch, maranta starch, sorghum starch, and mixtures thereof. In one preferred embodiment of the present invention, the at least one unmodified starch is selected from the group consisting of rice starch, potato starch, and mixtures thereof The at least one starch can also be modified with cationic and/or anionic groups. The term "modified" or "modified starch" in the meaning of the present invention refers to a starch, wherein at least a part of the hydroxyl groups is replaced by anionic and/or cationic groups. Thus, depending on the type and number of substitution groups, a modified starch can be a cationic starch, an amphoteric starch, or anionic starch. The starches used to obtain a modified starch can be of any desired origin, provided that the at least one starch contains free hydroxyl groups which can be modified.

According to another embodiment of the present invention, the at least one starch is cationic starch.

The cationic starch is preferably chemically modified with cationic groups selected from the group comprising amino groups, immonium groups, ammonium groups, sulfonium groups, phosphonium groups, and mixtures thereof. The cationic starch can be chosen from amongst the chemically modified starches originating from virtual any natural sources providing for starch in reasonable amounts. For example the cationic starch can be chosen from amongst the chemically modified starches originating from starches selected from the group comprising wheat starch, corn starch, rice starch, potato starch, tapioca starch, maranta starch, sorghum starch and mixtures thereof. In one preferred embodiment, the cationic starch is selected from those enriched in amylopectin, that is to say the chemically modified starch is preferably selected from the group consisting of rice starch, potato starch, and mixtures thereof. The cationic starch can also be obtained from genetically modified sources comprising amylopectin enriched starches. Methods for preparing such cationic starches are known by the skilled person. The molecular weight of the cationic starch can range from 1000 to 1000000 g/mol and is generally about 220000 g/mol. The molecular weight of the cationic starch can be adjusted by the treatment with hydrogen peroxide ($H_2O_2$).

According to still another embodiment of the present invention, the at least one starch is an amphoteric starch.

Preferably, the amphoteric starch is chemically modified with anionic groups selected from the group comprising carboxyl groups, carboxymethyl groups, carboxymethyl hydroxypropyl groups, carboxymethyl hydroxyethyl groups, phosphate groups, sulfonate groups and mixtures thereof. Additionally, the amphoteric starch can be chemically modified with cationic groups selected from the group comprising amino groups, immonium groups, ammonium groups, sulfonium groups, phosphonium groups and mixtures thereof. For example, the amphoteric starch can be chemically modified with anionic groups selected from carboxyl groups and carboxymethyl groups. Additionally, the amphoteric starch can be chemically modified with cationic groups selected from tertiary amino groups and quaternary ammonium groups. In one preferred embodiment, the amphoteric starch is chemically modified with carboxymethyl groups as anionic groups and quaternary ammonium groups as cationic groups. The amphoteric starch can be chosen from amongst the chemically modified starches originating from starches selected from the group comprising wheat starch, corn starch, rice starch, potato starch, tapioca starch, maranta starch, sorghum starch and mixtures thereof. In one preferred embodiment, the amphoteric starch is selected from those enriched in amylopectin, that is to say the chemically modified starch is preferably selected from the group consisting of rice starch, potato starch, and mixtures thereof. The amphoteric starch can also be obtained from genetically modified sources comprising amylopectin enriched starches. Methods for preparing such amphoteric starches are known by the skilled person. The molecular weight of the amphoteric starch can range from 1000 to 1000000 g/mol and is generally about 220000 g/mol. The molecular weight of the amphoteric starch can be adjusted by the treatment with hydrogen peroxide ($H_2O_2$).

Preferably, the amphoteric starch can be chemically modified with anionic groups as well as cationic groups such that the ratio between the degree of anionic substitution and the degree of cationic substitution ($DS_a/DS_c$) of the hydroxyl groups is more than 0.8 and preferably more than 0.9. In one embodiment of the present invention, the hydroxyl groups of the amphoteric starch are chemically modified with anionic groups as well as cationic groups such that the ratio between the degree of anionic substitution and the degree of cationic substitution ($DS_a/DS_c$) of the hydroxyl groups is equal 1.0. Additionally or alternatively, the amphoteric starch can be chemically modified with anionic groups as well as cationic groups such that the ratio of the anionic charge to the cationic charge lies in the range from 55:45 to 45:55 Mol-%, more preferably in the range from 53:47 to 47:53 Mol-% and most preferably in the range from 51:49 to 49:51 Mol-%.

According to still another embodiment of the present invention, the at least one starch is an anionic starch.

The anionic starch is preferably chemically modified with anionic groups selected from the group comprising carboxyl groups, carboxymethyl groups, carboxymethyl hydroxypropyl groups, carboxymethyl hydroxyethyl groups, phosphate groups, sulfonate groups and mixtures thereof. The anionic starch can be chosen from amongst the chemically modified starches originating from starches selected from the group comprising wheat starch, corn starch, rice starch, potato starch, tapioca starch, maranta starch, sorghum starch and mixtures thereof. In one preferred embodiment, the anionic starch is selected from those enriched in amylopectin, that is to say the chemically modified starch is preferably selected from the group consisting of rice starch, potato starch, and mixtures thereof. The anionic starch can also be obtained from genetically modified sources comprising amylopectin enriched starches. Methods for preparing such anionic starches are known by the skilled person. The molecular weight of the anionic starch can range from 1000 to 1000000 g/mol and is generally about 220000 g/mol. The molecular weight of the anionic starch can be adjusted by the treatment with hydrogen peroxide ($H_2O_2$).

In one preferred embodiment of the present invention, the at least one starch is composed of only one type of starch. In another preferred embodiment of the present invention, the at least one starch is composed of a mixture of two or more types of starch.

The at least one starch may be provided in dry form, in swollen form, or in cooked form. Accordingly, the at least one starch can be dry starch, swollen starch, or cooked starch.

Starch granules are insoluble in cold water and only become soluble in water when heated. The granules swell and burst, the semi-crystalline structure is lost and the smaller amylose molecules start leaching out of the granule, forming a network that holds water and increasing the viscosity of the mixture. This process is called starch gelatinization or "swelling". Each type of starch has its own gel temperature (or gelatinization temperature). Swollen starch granules are clearly distinguishable from cooked starch. Cooked starch is obtained when swollen starch is heated above the gel temperature. Thereby, the swollen starch granules rupture and amylose and amylopectin are released, which dissolve in the aqueous medium.

According to one embodiment of the present invention, the at least one starch is provided in dry form. Thus, the at least one starch is added in dry form during process step iv). For example, the at least one starch can be provided in form of a dry powder, dry granules, or dry flakes.

According to a preferred embodiment, the at least one starch is provided in form of a dry powder.

According to a preferred embodiment, the at least one starch is a cationic starch and is provided in dry form.

Alternatively, the at least one starch can be provided in form of a "starch solution" or a "starch suspension".

The term "starch solution" in the meaning of the present invention refers to a system comprising solvent and starch, wherein the particles of the at least one starch are dissolved in the solvent. The term "dissolved" in the meaning of the present invention refers to systems in which no discrete solid particles are observed in the solvent, i.e. the at least one starch forms a hydrocolloidal solution.

If the at least one starch is provided in form of a starch solution, the solution can be in form of an aqueous solution, i.e. the at least one starch is provided in water. Alternatively, the starch solution can be in form of an organic solution, i.e. the at least one starch is provided in an organic solvent selected from the group comprising methanol, ethanol, acetone and mixtures thereof. The starch solution can be prepared in that the at least one starch is added to a solvent, preferably water, having a temperature of ≤40° C., preferably between 5° C. and 40° C., more preferably between 10° C. and 40° C. and most preferably from 15° C. to 30° C. For example, the solution is prepared in that the at least one is added to water having about room temperature.

The term "starch suspension" in the meaning of the present invention refers to a system comprising solvent and starch, wherein at least a part of the particles of the at least one starch are present as insoluble solids in the solvent. Said term does not exclude that a part of the at least one starch is dissolved in the solvent.

A starch suspension may be prepared in that the at least one starch is added to a solvent, preferably water, having a temperature of ≤40° C., preferably between 5° C. and 40° C., more preferably between 10° C. and 40° C. and most preferably from 15° C. to 30° C. In one preferred embodiment, the starch suspension is prepared in that the at least one starch is added to water at about room temperature. If the at least one starch is provided in form of a starch suspension, the suspension preferably comprises an amount of dissolved starch of less than 50 wt.-%, based on the total amount of starch added to the starch suspension. Preferably, the starch suspension preferably comprises an amount of dissolved starch of less than 40 wt.-%, preferably less than 35 wt.-% and most preferably less than 30 wt.-%, based on the total amount of starch in the starch suspension.

According to one embodiment of the present invention, the at least one starch is in form of a starch solution or starch suspension having a starch concentration ranging from 1 wt.-% to 50 wt.-%, preferably from 10 wt.-% to 50 wt.-%, more preferably from 15 wt.-% to 45 wt.-% and most preferably from 20 wt.-% to 45 wt.-%, based on the total weight of the starch solution or starch suspension.

It is generally considered that the initial viscosity (before adding the starch during carbonation) of the starch solution or starch suspension of the present invention is satisfactory with respect to the envisaged use. In particular, the starch solution or starch suspension may have a Brookfield viscosity at 25° C., in the range of 1 to 2 500 mPa·s, preferably in the range of 10 to 2 000 mPas, more preferably in the range of 20 to 1 500 mPa·s, even more preferably in the range of 20 to 1 000 mPa·s, and most preferably in the range of 50 to 500 mPa·s.

According to another embodiment of the present invention, the at least one starch is provided as swollen starch. Swollen starch may be prepared by dispersing dry starch in a solvent, preferably water, and heating the suspension to a temperature that is approximately the gel point of the particular starch. The gel temperature of a particular starch may be available in the literature or can be empirically determined by heating a particular starch suspension while monitoring the viscosity. According to one embodiment, swollen starch is prepared by dispersing dry starch in water and heating the suspension approximately up to the temperature at which the specific starch has been completely swollen (gelatinization temperature). As mentioned, the gelatinization temperature differs depending on which starch that is used, some types of unmodified starches start swelling at 55° C., while other types at e.g. 65° C. or 85° C.

According to one embodiment, the swollen starch granules have a median particles size $d_{50}$ from 25 to 100 µm.

According to still another embodiment of the present invention, the at least one starch is provided as cooked starch. Cooked starch may be prepared by dispersing dry starch in a solvent, preferably water, and heating the suspension to a temperature above the gel point of the particular starch. According to one embodiment, cooked starch is prepared by dispersing dry starch in water and heating the suspension up to a temperature of 100° C. until the starch has been completely dissolved in the water.

According to one embodiment of the present invention the at least one starch of step ii) is added in an amount from 0.1 to 20 wt.-%, based on the total weight of the calcium oxide containing material, preferably in an amount from 0.5 to 10 wt.-%, more preferably in an amount from 0.8 to 5 wt.-%, and most preferably in an amount from 1 to 3 wt.-%.

In addition to the example embodiments of the invention described herein above, other embodiments, other steps and other elements are also contemplated. Those knowledgeable in the art will appreciate that the present invention lends itself to other papers and other methods for making papers that will be understood based on consideration of the detailed description of example invention embodiments provided herein above.

Suspension Comprising Calcium Hydroxide, Also Known as Milk of Lime

According to one embodiment, the suspension comprising calcium hydroxide (or milk of lime) has a solids content from 5 to 25 wt.-%, based on the total weight of the milk of lime, preferably from 10 to 20 wt.-%, and most preferably from 10 to 15 wt.-%.

According to one embodiment, the suspension comprising calcium hydroxide has a Brookfield viscosity from 1 to 1000 mPa·s at 25° C., more preferably from 5 and 800 mPa·s at 25° C., and most preferably from 10 and 600 mPa·s at 25° C. According to one embodiment, the Brookfield viscosity is measured at 100 rpm.

Carbonation of Suspension Comprising Calcium Hydroxide

The suspension comprising calcium hydroxide is carbonated at a temperature between 30 and 100° C. and over a reaction time period $\Delta t_C$ to form an aqueous suspension of precipitated calcium carbonate, wherein the at least one starch is added during the reaction time period $\Delta t_C$ after 25 percent of the reaction time period $\Delta t_C$ is elapsed.

The carbonation is carried out by means and under conditions well-known by the person skilled in the art. The introduction of carbon dioxide into the milk of lime quickly results in the formation of the carbonate ion ($CO_3^{2-}$), and thus, the requisite concentration for calcium carbonate to be formed. Particularly, the carbonation reaction can be readily controlled considering the reactions involved in the carbonation process. Carbon dioxide dissolves according to its partial pressure forming carbonate ions via the formation of carbonic acid ($H_2CO_3$), which, in such an alkaline solution, dissociates to its constituent hydrogen and carbonate ions. Once the ionic product of calcium carbonate is sufficiently greater than the solubility product, calcium carbonate precipitates. At the same time, hydroxide ions are neutralized by the dissociated hydrogen ions. As a result the ionic product for calcium hydroxide would therefore be less than the solubility product, and it would continue to dissolve. This occurs continually, so long as $CO_2$ is bubbled into solution, until all calcium hydroxide is consumed, or is trapped in the calcium carbonate crystal structure.

According to the present invention, the carbonation is carried out over a reaction time period $\Delta t_C$. For the purpose of the present invention, the reaction time period $\Delta t_C$ is defined in that it starts at a time $t_0$ with addition of carbon dioxide and ends at a time $t_C$, at which the milk of lime has a pH of about 7 (in the range of 7.0 to 7.5).

According to one embodiment of the present invention, the carbonation is carried out by feeding pure gaseous carbon dioxide or technical gases containing at least 10 vol.-% of carbon dioxide into the milk of lime. The beginning of the carbon dioxide addition marks the time $t_0$, at which the time period $\Delta t_C$ starts.

The progress of the carbonation reaction can be readily observed by measuring the conductivity, density, turbidity and/or pH. In this respect, the pH of the milk of lime before addition of carbon dioxide will be more than 10, usually between 11 and 12.5, and will constantly decrease until a pH of about 7 (in the range of 7.0 to 7.5) is reached. At this point the reaction period $\Delta t_C$ ends and the reaction can be stopped.

Conductivity slowly decreases during the carbonation reaction and rapidly decreases to low levels, when the precipitation is completed. The progress of the carbonation may also be monitored by measuring the pH and/or the conductivity of the reaction mixture.

According to one embodiment of the present invention, the temperature of the milk of lime which is used in the carbonation is adjusted to be in the range from 10° C. to 60° C. It will be apparent to the skilled person that the initial temperature of the milk of lime is not necessarily the same one as the temperature of the reaction mixture due to the exothermic carbonation reaction and/or due to the mixing of substances having different temperatures.

According to one embodiment of the present invention the carbonation is carried out at a temperature between 50 and 100° C., preferably between 60 and 90° C., more preferably between 60 and 80° C., and most preferably from 65 to 70° C.

According to the process of the present invention, the at least one starch is added during the reaction time period $\Delta t_C$ after 25 percent of the reaction time period $\Delta t_C$ is elapsed. The inventors of the present application surprisingly found that the addition of at least one starch during the added during the reaction time period $\Delta t_C$ after 25 percent of the reaction time period $\Delta t_C$ is elapsed, can result in a precipitated calcium carbonate, which leads to a better retention of the PCC particles during paper production processes. Furthermore, the inventors surprisingly found that paper products comprising the inventive PCC particles as filler material exhibit an improved strength, and also allow the production of papers with high content of filler material. Another advantage is that the physical and optical properties of paper comprising the inventive self-binding pigment particles as filler material are not impaired to any substantial degree.

According to one embodiment of the present invention, the at least one starch is added after 40 percent of the reaction time period $\Delta t_C$ is elapsed, preferably after 50 percent of the reaction time period $\Delta t_C$ is elapsed, more preferably after 60 percent of the reaction time period $\Delta t_C$ is elapsed, and most preferably after 75 percent of the reaction time period $\Delta t_C$ is elapsed.

The carbonation can be carried out in form of a batch process, a semi-continuous or a continuous process. According to one embodiment, the process of the present invention is carried out in form of a batch process, a semi-continuous or a continuous process.

According to one embodiment of the present invention, the obtained precipitated calcium carbonate has a weight median particle size $d_{50}$ from 0.1 to 100 µm, preferably from 0.25 to 50 µm, more preferably from 0.3 to 5 µm, and most preferably from 0.4 to 3.0 µm.

The precipitated calcium carbonate may have aragonitic, calcitic, or vateritic crystal structure, or mixtures thereof. It is a further advantage of the present invention that the crystal structure and morphology of the precipitated calcium carbonate can be controlled, e.g. by addition of seed crystals or other structure modifying chemicals. According to a preferred embodiment, the precipitated calcium carbonate obtained by the inventive process has a clustered scalenohedral crystal structure.

The morphological structure of the precipitated calcium carbonate can also be controlled by carrying out the carbontion in a specific temperature range. According to one embodiment of the present invention, the carbonation is carried out at a temperature from 40 to 60° C. to form an aqueous suspension of scalenohedral PCC.

The BET specific surface area of the precipitated calcium carbonate obtained by the process according to the present invention may be from 1 to 100 $m^2/g$, preferably from 2 to 70 $m^2/g$, more preferably from 3 to 50 $m^2/g$, especially from 4 to 30 $m^2/g$, measured using nitrogen and the BET method according to ISO 9277. The BET specific surface area of the precipitated calcium carbonate obtained by the process of the present invention may be controlled by the use of additives, e.g. surface active agents, shearing during the precipitation step or thereafter at high mechanical shearing rates not only leading to a low particle size, but also to a high BET specific surface area.

According to one embodiment of the present invention, the obtained suspension of precipitated calcium carbonate has a solids content of at least 5 wt.-%, preferably from 10 to 50 wt.-%, more preferably from 12 to 45 wt.-%, and most preferably from 14 to 40 wt.-%, based on the total weight of the suspension.

According to one embodiment of the present invention, the obtained suspension of PCC has a Brookfield viscosity of less than or equal to 1000 mPa·s at 25° C., more preferably less than or equal to 800 mPa·s at 25° C., and most preferably less than or equal to 600 mPa·s at 25° C. The Brookfield viscosity may be measured at 100 rpm.

Additional Process Steps

The process of the present invention can comprise additional process steps.

The milk of lime may be screened in order to remove oversize particles. A suitable screen can include, for example, a screen having a sieve size from 700 to 100 µm, for example, about 100 or about 300 µm. According to one embodiment of the present invention, the suspension of calcium hydroxide is screened before the carbonation step, preferably with a screen having a sieve size from 100 to 300 µm, and more preferably with a screen having a sieve size from 50 to 300 µm.

According to still another embodiment of the present invention, at least one slaking additive can be contained in the suspension of calcium hydroxide. By adding a slaking additive to the suspension of calcium hydroxide during its production, the size of the PCC particles and their crystal morphology can be controlled without affecting the viscosity of the aqueous suspension.

The at least one slaking additive may be selected from the group consisting of organic acids, organic acid salts, sugar alcohols, monosaccharides, disaccharides, gluconates, phosphonates, lignosulfonates, and mixtures thereof. According to one embodiment of the present invention, the at least one slaking additive is selected from the group consisting of sodium citrate, potassium citrate, calcium citrate, magnesium citrate, monosaccharides, disaccharides, sucrose, sugar alcohols, meritol, citric acid, sorbitol, sodium salt of diethylene triamine pentaacetic acid, gluconates, phosphonates, sodium tartrate, sodium lignosulfonate, calcium lignosulfonate, and mixtures thereof. According to a preferred embodiment, the at least one slaking additive is sodium citrate and/or saccharose.

According to one embodiment of the present invention, the at least one slaking additive consists of one type of slaking additive only. Alternatively, the at least one slaking additive can consist of a mixture of two or more types of slaking additives.

The at least one slaking additive may be provided in an amount from 0.01 to 0.2 wt.-%, based on the total amount of calcium oxide containing material, preferably in an amount from 0.05 to 1 wt.-%, more preferably from 0.06 to 0.8 wt.-%, and most preferably from 0.07 to 0.5 wt.-%.

According to another aspect of the present invention the mother liquor obtained after precipitation and/or any one of the reactants may be recycled into the process.

Products and their Use

According to the present invention, an aqueous suspension of precipitated calcium carbonate is provided, which is obtainable by the inventive process.

According to one embodiment, the aqueous suspension of precipitated calcium carbonate and/or precipitated calcium carbonate according to the present invention is used as filler or as coating pigment in paper applications, preferably as filler in paper and/or board, and more preferably as filler in calendered (SC) paper, ultralight weight coated (ULWC) paper, light weight coated (LWC) paper, medium weight coated (MWC) paper, heavy weight coated (HWC) paper, machine finished coated (MFC) paper, film coated offset (FCO) paper, woodfree coated (WFC) paper, light weight coated (LWCO) printing paper, SC offset (SCO) printing paper, machine finished specialties (MFS) paper, copy paper, newsprint paper, cardboard, chipboard, kraft board, laminated board, solid bleached board, solid bleached sulphate board, solid unbleached board, corrugated medium, linerboard, or binder's board.

Typical base weights of the different paper grades may be 40 to 80 $g/m^2$ for SC paper, 40 to 70 $g/m^2$ for LWC paper, 70 to 130 $g/m^2$ for MWC paper, 50 to 70 $g/m^2$ for MFC paper, 40 to 70 $g/m^2$ for FCO paper, 70 to 90 $g/m^2$ for MWC paper, 100 to 135 $g/m^2$ for HWC paper, or 80 to 140 $g/m^2$ for WFC.

The term "chipboard" may refer to a recycled, low quality board, the term "kraft board" may refer to a strong virgin fiber board often used for beverage carriers, and the term "laminated board" may refer to a lamination of paperboards and other materials, for example liquid packaging board. The terms "solid bleached board (SBB)" or "solid bleached sulphate (SBS)" may refer to a clean white board used for foods etc., and the term "solid unbleached board (SUB)" may refer to board made from unbleached chemical pulp. The term "corrugated medium" may refer to the inner fluted portion of corrugated fiberboard, and the term "linerboard" may refer to a strong stiff board for one or both sides of corrugated boxes. It may be the flat covering over the corrugating medium. The term "binder's board" may refer to a paperboard used in bookbinding for making hardcovers.

DESCRIPTION OF THE FIGURES

FIG. 6 shows different parameters of the hand sheets prepared in the hand sheet study.

EXAMPLES

1. Measurement Methods

Figure 1:
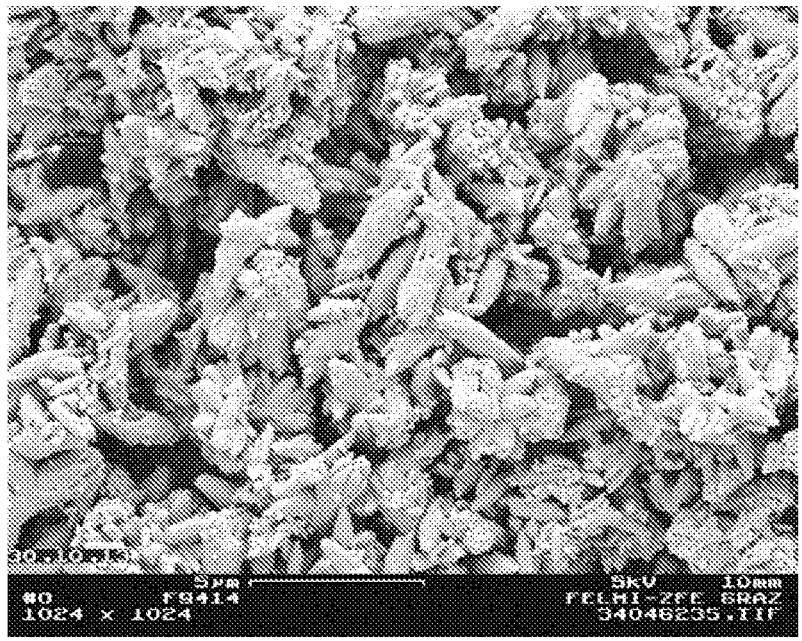
FIG. 1 shows the SEM image of PCC particles (PCC 1) obtained according to Example 1 (comparative example), where 1 wt.-% of starch has been added to the milk of lime before carbonation.

In the following, measurement methods implemented in the examples are described.

Particle Size Distribution of Precipitated Calcium Carbonate (PCC)

The particle size distribution of the prepared PCC particles was measured using a Malvern Mastersizer 3000, from the company Malvern. The method and the instrument are known to the skilled person and are commonly used to determine grain size of fillers and pigments.

Solids Content of an Aqueous Suspension

The suspension solids content (also known as "dry weight") was determined using a Moisture Analyser MJ33 from the company Mettler-Toledo, Switzerland, with the following settings: drying temperature of 160° C., automatic switch off if the mass does not change more than 1 mg over a period of 30 sec, standard drying of 5 to 20 g of suspension.

Specific Surface Area (SSA)

The specific surface area was measured via the BET method according to ISO 9277 using nitrogen, following conditioning of the sample by heating at 250° C. for a period of 30 minutes. Prior to such measurements, the sample is filtered within a Buchner funnel, rinsed with deionised water and dried overnight at 90 to 100° C. in an oven. Subsequently the dry cake is ground thoroughly in a mortar and the resulting powder placed in a moisture balance at 130° C. until a constant weight is reached.

X-Ray Diffraction

The purity of the PCC samples was analysed with a D8 Advance powder diffractometer (Bruker Corporation, USA) obeying Bragg's law. This diffractometer consisted of a 2.2 kW X-ray tube (Cu), a sample holder, a θ-θ goniometer, and a VÅNTEC-1 detector. Nickel-filtered Cu $K_\alpha$ radiation was employed in all experiments ($\lambda K_{\alpha\text{-}Cu}$=1.5406 Å). The profiles were chart recorded automatically using a scan speed of 0.7° per minute in (XRD GV_7600). The measurement was carried out at angles from 5 to 70°.

The resulting powder diffraction pattern was classified by mineral content using the DIFFRAC$^{suite}$ software packages EVA and SEARCH, based on reference patterns of the ICDD PDF 2 database (XRD LTM_7603). Quantitative analysis of the diffraction data, i.e. the determination of amounts of different phases in a multi-phase sample, has been performed using the DIFFRAC$^{suite}$ software package TOPAS (XRD LTM_7604). This involved modelling the full diffraction pattern (Rietveld approach) such that the calculated pattern(s) duplicated the experimental one.

Pigment Brightness and Paper Opacity

Pigment brightness and paper opacity were measured using an ELREPHO 3000 from the company Datacolor according to ISO 2469:1994 (DIN 53145-2:2000 and DIN 53146:2000).

Whiteness (R457) Index Measurement

Whiteness index was determined according to norm TAPPI T452/ISO 247. Glossiness was determined according to DIN 54 502/TAPPI 75.

Light Scattering

Light scattering was measure according to ISO 9416: 2009.

Filler Content

The filler content in the handsheets was determined by burning a quarter of a dry handsheet in a muffle furnace heated to 570° C. After the burning was completed, the residue was transferred in a desiccator and allowed to cool down. When room temperature was reached, the weight of the residue was measured and the mass was related to the initially measured weight of the dry quarter hand sheet.

Mechanical Properties of Handsheets

The mechanical strength properties of the produced paper samples were characterised after drying of the paper samples by the tensile strength according to ISO 1924-2, the tensile energy absorption according to ISO 1924-2 the tensile energy absorption index according to ISO 1924-2, the tensile index according to ISO 1924-2.

2. Materials

Calcium oxide, CaO, Réty Lhoist

Starch

Cationic: potato starch (Degree of substitution: 0.045), Roquette Actim, France

Fibers: *Eucalyptus* 30° SR

Retention aid: Nalco 74628 (in all sheets 0.06%)

Tap water

Slaking of Calcium Oxide milk of lime preparation (suspension of calcium hydroxide) via standard lab slaking of CaO Réty standard slaking with 5 liter tap water (40° C.) and 1000 g CaO Slaking for 25 min.

Then addition of 4 liter tab water. Total slaking time 30 min.

Sieving over a 100 microns sieve, to obtain the milk of lime (or suspension of calcium hydroxide) that was used in the following examples.

Figure 5:
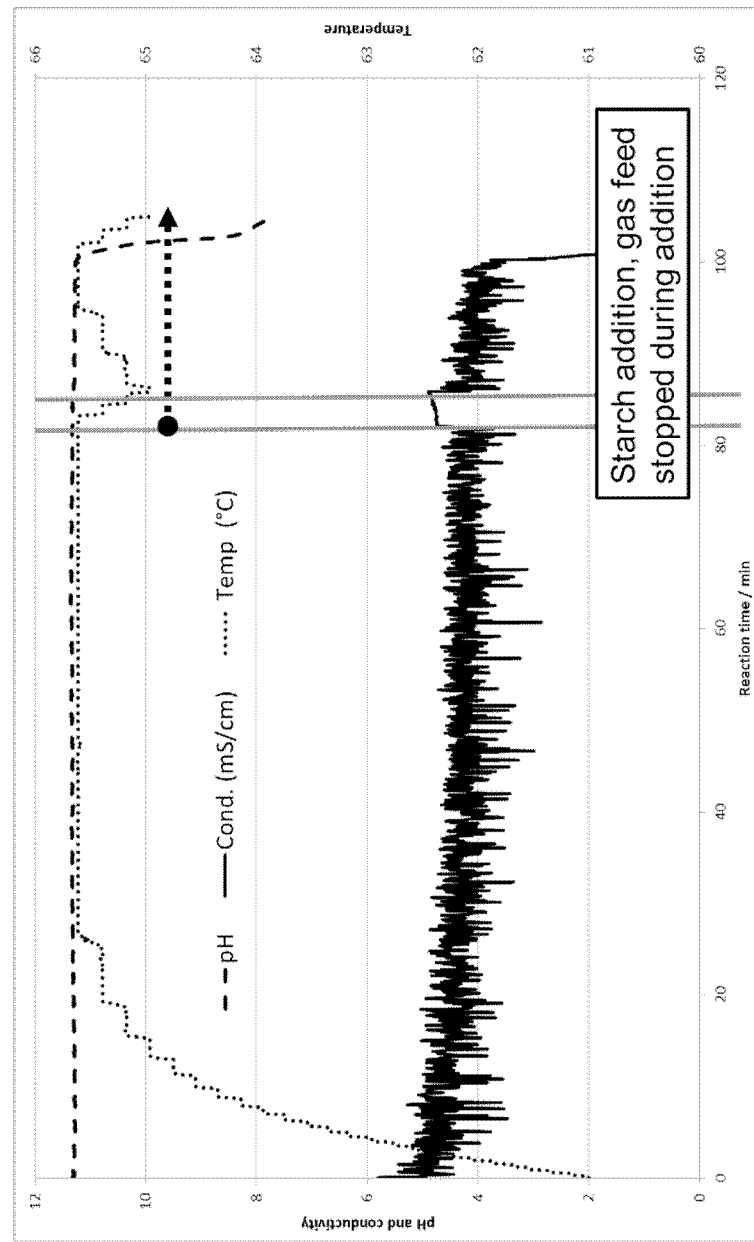
FIG. 5 shows the conductivity, pH and temperature logging of PCC 8 obtained according to Example 3 (inventive example).

Carbonation standard lab carbonation: 60° C. starting temp. 15 l/min 20% $CO_2$, 750 rpm pH, conductivity and temperature logging PCC Laboratory Reactor A stainless steel reactor with a total volume of 10 liter, filled with an amount of 8 liter calcium hydroxide in tap water was used. The solids content of the aqueous calcium hydroxide slurry was about 14% by weight. The initial temperature of the aqueous calcium hydroxide slurry was about 61° C. The content of the reaction vessel was stirred at a 750 rpm. Gas containing carbon dioxide (20 vol.-%) at a rate of 15 l/min and air at a rate of 60 l/min was injected into the reaction vessel until a pH of approximately 7 was reached. Conductivity, pH and temperature were continuously logged (FIG. 5). The resultant precipitated calcium carbonate was a scalenohedral precipitated calcium carbonate (S-PCC).

Suspension Conductivity Measurement

The conductivity of the suspension was measured directly in the reaction vessel during the reaction using an Endress+Hauser logging software, Memobase Plus, and an Indumax CLS50D conductivity probe.

Suspension pH Measurement

The pH of the suspension was measured directly in the reaction vessel during the reaction using an Endress+Hauser logging software, Memobase Plus, and a CPS96D pH electrode.

Weight Solids (% by Weight) of a Material in Suspension

The weight solids (also called solids content of a material) was determined by dividing the weight of the solid material by the total weight of the aqueous suspension.

Example 1 (Comparative)

Cationic starch was added as a pre-addition to the milk of lime ($Ca(OH)_2$), before the carbonation was started.

Figure 2:
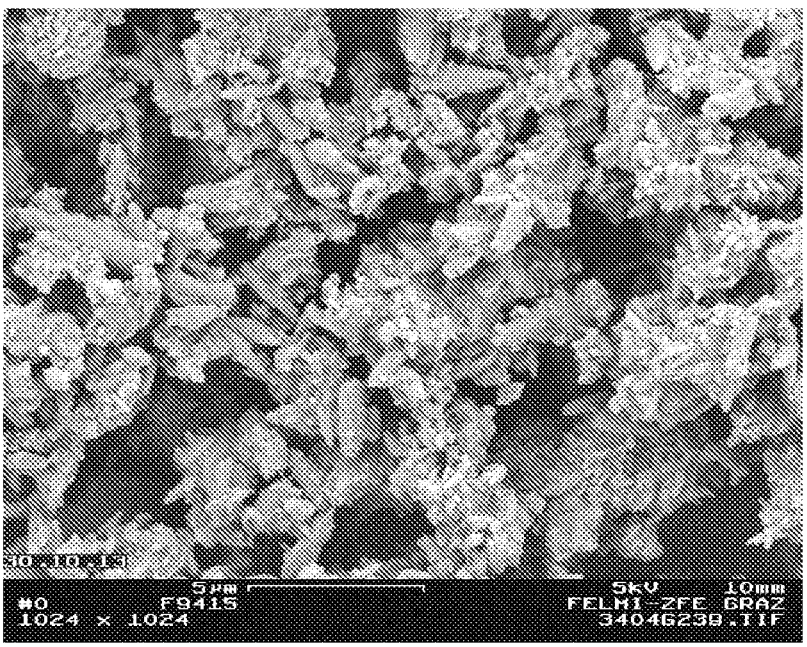
FIG. 2 shows the SEM image of PCC particles (PCC 2) obtained according to Example 1 (comparative example), where 5 wt.-% of starch has been added to the milk of lime before carbonation.

PCC 1. 1 wt-% (calculated on the estimated dry mass of the PCC when the reaction is done, i.e. 17% solids content) cationic starch was added as powder to the milk of lime ($Ca(OH)_2$). The total carbonation time was 110 minutes. The gas feed was 15 l/min $CO_2$ mixed with 60 l/min air, and the reactor volume 10 liter, filled with 8 liter $Ca(OH)_2$ slurry at a solids content of 14%. The reactor temperature was about 65° C. FIG. 1, SEM image PCC 2. 5 wt-% (calculated on the estimated dry mass of the PCC when the reaction is done, i.e. 17% solids content) cationic starch was added as powder to the milk of lime ($Ca(OH)_2$). The total carbonation time was 110 minutes. The gas feed was 15 l/min $CO_2$ mixed with 60 l/min air, and the reactor volume 10 liter, filled with 8 liter $Ca(OH)_2$ slurry at a solids content of 14%. The reactor temperature was about 65° C. FIG. 2, SEM image.

As can be seen in FIGS. 1 and 2, the resulted PCC shows low brightness, changed particle shape and sieving problems due to high viscosity. (Compare SEM, FIGS. 1 and 2 to the reference sample without any starch addition in FIG. 3.)

Example 2 (Comparative)

2 wt-% cationic starch was added as a post addition to the readymade PCC.

Figure 3:
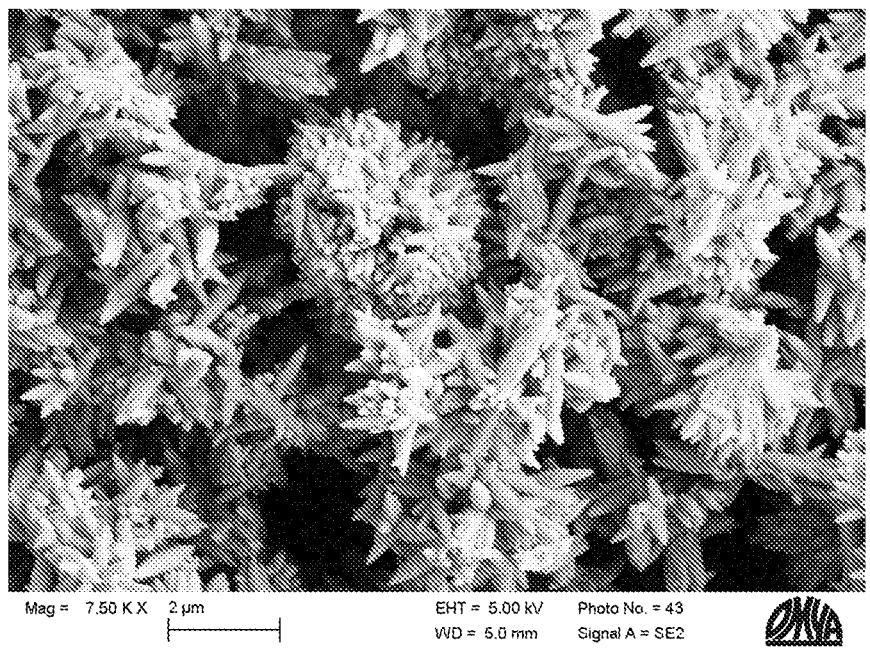
FIG. 3 shows the SEM image of PCC particles (PCC 3) obtained according to Example 2 (comparative example), where no starch has been added to the milk of lime.

The total carbonation time was 110 minutes. The gas feed was 15 l/min $CO_2$ mixed with 60 l/min air, and the reactor volume 10 liter, filled with 8 liter CaOH slurry at a solids content of 14%. The reactor temperature was about 65° C. FIG. 3, SEM image. The resulting PCC was a S-PCC with solids content of 17%.

PCC 3. PCC without addition of any starch. (This PCC has been used in hand sheet trials Nos. 1 and 2).

PCC 4. 2 wt-% (calculated on the dry mass of the PCC, 17% solids content) cationic starch was added in powder form and stirred with the 65° C. warm PCC for 30 minutes. (This PCC has been used in hand sheet trials Nos. 7 and 8).

PCC 5. 2 wt-% (calculated on the dry mass of the PCC, 17% solids content) cationic starch was added as preheated in water to 65° C. (2-wt % solution) and stirred with the 65° C. warm PCC for 30 minutes. (This PCC has been used in hand sheet trials Nos. 9 and 10).

PCC 6. 2 wt-% (calculated on the dry mass of the PCC, 17% solids content) cationic starch was added as cooked in water (open boiling) (2-wt % solution) and stirred with the 65° C. warm PCC for 30 minutes. (This PCC has been used in hand sheet trial No. 11).

Example 3 (Inventive)

Cationic starch was added into the PCC reactor during carbonation in powder form. The total carbonation time was 110 minutes. The gas feed was 15 l/min $CO_2$ mixed with 60 l/min air, and the reactor volume 10 liter, filled with 8 liter $Ca(OH)_2$ slurry at a solids content of 14%. The reactor temperature was about 65° C.

PCC 7. 2 wt-% (calculated on the estimated dry mass of the PCC when the reaction is done, i.e. 17% solids content) cationic starch was added into the PCC reactor during carbonation in powder form, at 50% of the reaction time, i.e. after 55 minutes. (This PCC has been used in hand sheet trials Nos. 3 and 4).

Figure 4:
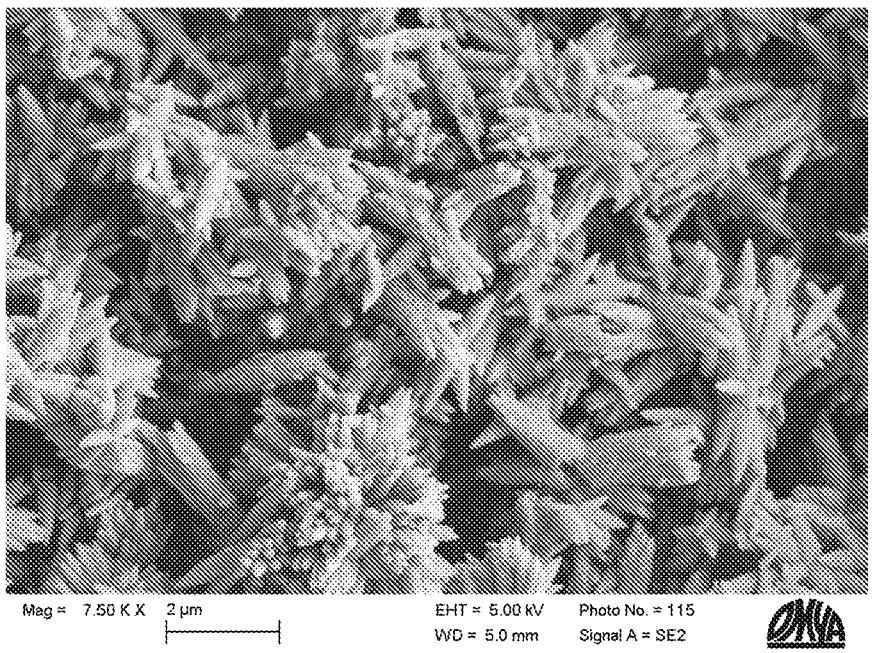
FIG. 4 shows the SEM image of PCC particles (PCC 8) obtained according to Example 3 (inventive example), where 2 wt.-% of starch were added to the milk of lime after 75% of the carbonation time.

PCC 8. 2 wt-% (calculated on the estimated dry mass of the PCC when the reaction is done, i.e. 17% solids content) cationic starch was added into the PCC reactor during carbonation in powder form, at 75% of the reaction time, i.e. after 82 minutes. (This PCC has been used in hand sheet trials Nos. 5 and 6). FIG. 4, SEM image. FIG. 5 shows the pH, conductivity and temperature logging for the manufacturing.

PCC 9. 3 wt-% (calculated on the estimated dry mass of the PCC when the reaction is done, i.e. 17% solids content) cationic starch was added into the PCC reactor during carbonation in powder form, at 75% of the reaction time, i.e. after 82 minutes.

Hand Sheet Study

Grammage: 80 g/m$^2$

Total amount cationic starch in all trial sheets: 10 kg/ton, time and form of addition varied Target filler (PCC) load (ash content): 25% and 30%. Exact achieved filler load (ash content) measured from each analyzed sheet and listed in FIG. 6.

Fibers: *Eucalyptus* 30° SR

Retention aid: Nalco 74628 (in all sheets 0.06%)

Tap water

Comparative Samples (Trials Nos. 1 and 2)

No addition of starch added in the production of the PCC. 10 kg/ton starch was added in the mixing chest.

1. *Eucalyptus* fibers, target 25 wt-% PCC 3 load+10 kg/ton cationic starch+0.06% retention aid
2. *Eucalyptus* fibers, target 30 wt-% PCC 3 load+10 kg/ton cationic starch+0.06% retention aid Inventive Samples (Trials Nos. 3 to 9)

5 kg/ton starch addition as included in the PCC (equals 2 wt-% calculated dry/dry on the PCC). Starch added during carbonation to the PCC. 5 kg/ton starch addition in the mixing chest.

3. *Eucalyptus* fibers, target 25 wt-% PCC 7 load+5 kg/ton cationic starch+0.06% retention aid
4. *Eucalyptus* fibers, target 30 wt-% PCC 7 load+5 kg/ton cationic starch+0.06% retention aid
5. *Eucalyptus* fibers, target 25 wt-% PCC 8 load+5 kg/ton cationic starch+0.06% retention aid
6. *Eucalyptus* fibers, target 30 wt-% PCC 8 load+5 kg/ton cationic starch+0.06% retention aid Comparative Samples (Trials Nos. 7 to 11)

5 kg/ton starch addition as included in the PCC (equals 2 wt-% calculated dry/dry on the PCC). Starch added as post addition to the PCC. 5 kg/ton starch addition in the mixing chest.

7. *Eucalyptus* fibers, target 25 wt-% PCC 4 load+5 kg/ton cationic starch+0.06% retention aid
8. *Eucalyptus* fibers, target 30 wt-% PCC 4 load+5 kg/ton cationic starch+0.06% retention aid 9. *Eucalyptus* fibers, target 25 wt-% PCC 5 load+5 kg/ton cationic starch+0.06% retention aid 10. *Eucalyptus* fibers, target 30 wt-% PCC 5 load+5 kg/ton cationic starch+0.06% retention aid 11. *Eucalyptus* fibers, target 30 wt-% PCC 6 load+5 kg/ton cationic starch+0.06% retention aid As can be seen from FIG. 6, the inventive samples (Trial No. 3-6) shows higher tensile strengths compared to the comparative samples at similar filler loads. The tensile strength and the opacity of a sheet with a filler load of about 30% according to the invention are comparable with the strength and opacity of a sheet with a filler load of about 25% according to the prior art (cf. e.g. Trial No. 6 and Trial No. 1). Thus, the results show that the inventive concept makes it possible to use higher filler loads and still achieve acceptable strength and opacity levels.

The invention claimed is:

1. A method of producing a filler to be used in paper or board production, said method comprising the steps of:
    providing a suspension comprising calcium hydroxide;
    adding carbon dioxide to said suspension until a predetermined pH range is reached;
    performing carbonation of said calcium hydroxide to form precipitated calcium carbonate (PCC), until a predetermined pH range of 7.0-7.5 is reached and a decrease in conductivity below 2 mS/cm is reached,
    wherein starch is added to said suspension during carbonation when between 75%-95% of the calcium hydroxide present in the suspension has reacted with carbon dioxide,
    wherein said predetermined pH ranges and said decrease in conductivity is reached due to the presence of said calcium hydroxide in said suspension, wherein said starch before added to said suspension is either untreated, or treated by heating the starch up to, but no above the gelatinization temperature of that starch.

2. A method according to claim 1, wherein the starch is uncooked.

3. A method according to claim 1, wherein the starch is swollen starch.

4. A method according to claim 1, wherein the reaction temperature during the carbonation is between 50-100° C.

5. A method according to claim 1, wherein carboxy methyl cellulose (CMC) is further added to said suspension during carbonation.

* * * * *